D. M. SMITH.
MOTOR VEHICLE TRANSMISSION GEARING.
APPLICATION FILED MAR. 6, 1914.
1,177,826.
Patented Apr. 4, 1916.
3 SHEETS—SHEET 3.
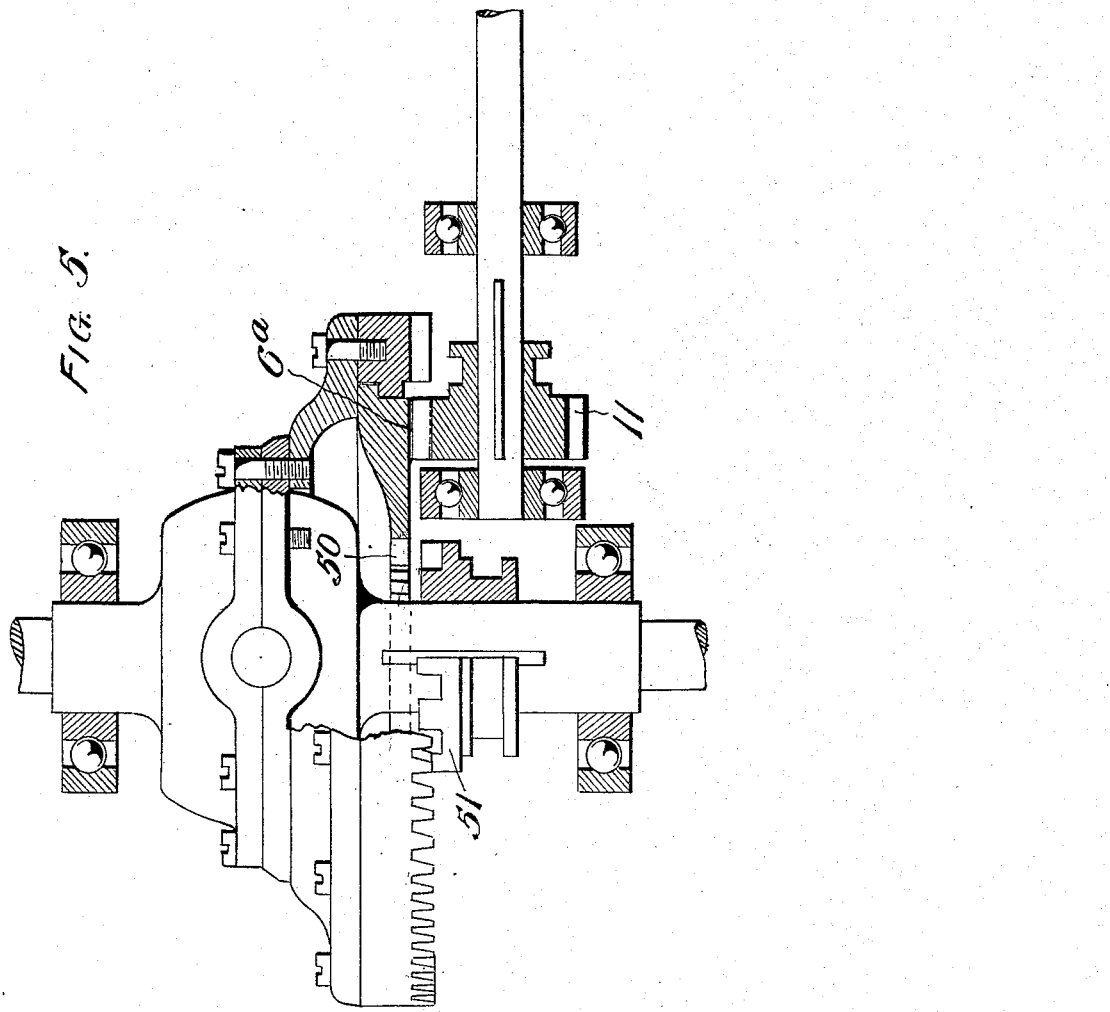

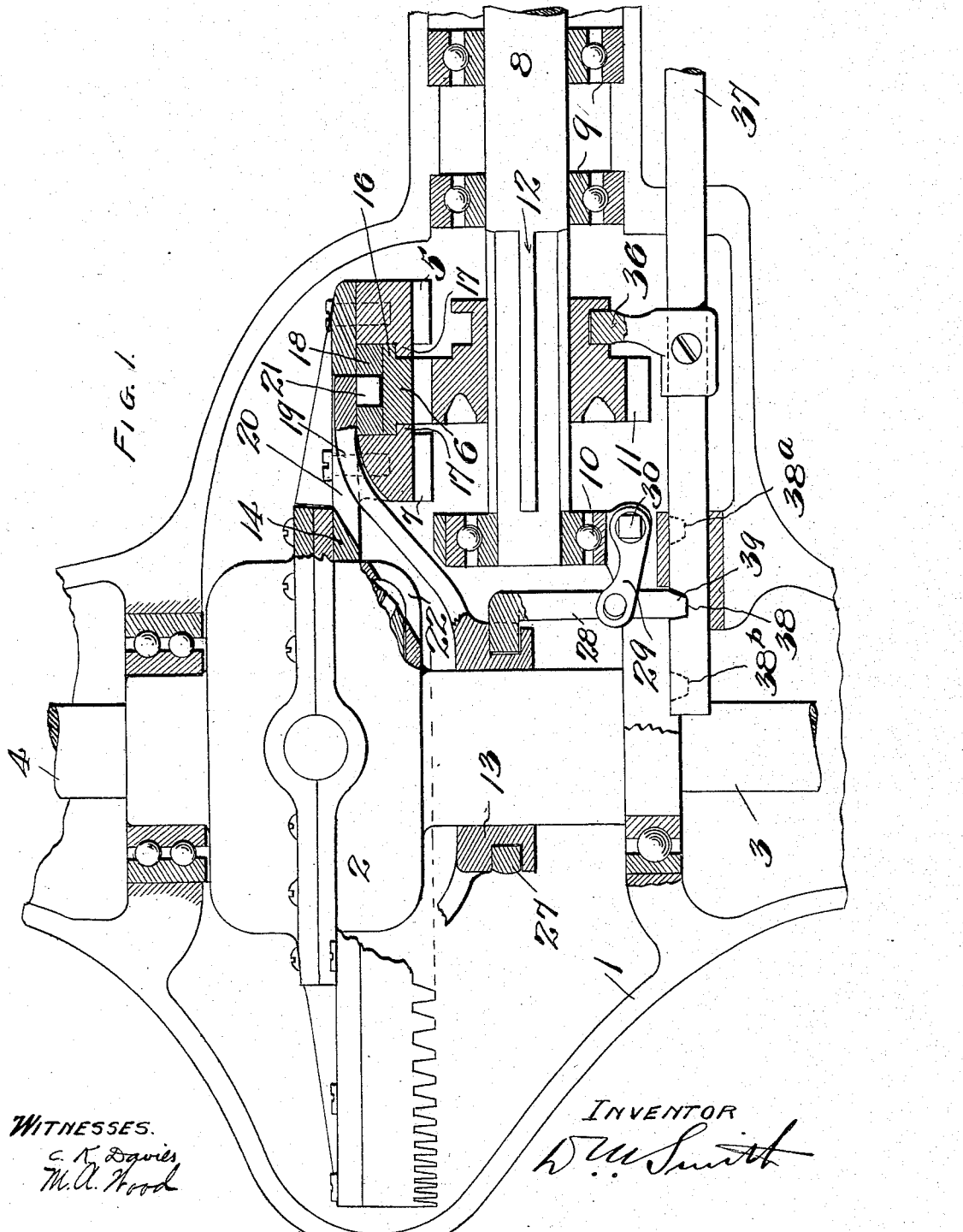

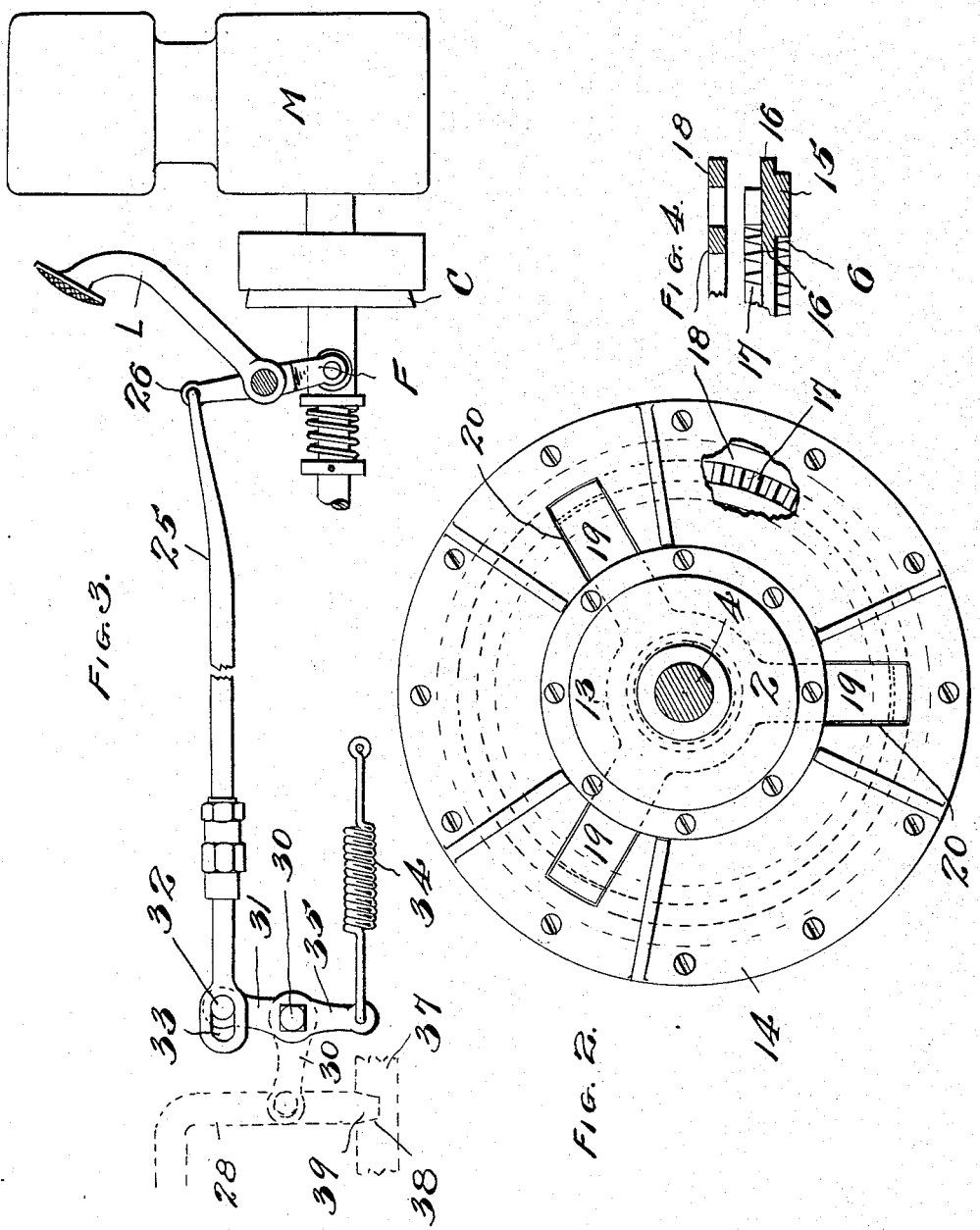

UNITED STATES PATENT OFFICE.

DEMPSTER M. SMITH, OF WASHINGTON, DISTRICT OF COLUMBIA.

MOTOR-VEHICLE TRANSMISSION-GEARING.

1,177,826.   Specification of Letters Patent.   Patented Apr. 4, 1916.

Application filed March 6, 1914. Serial No. 822,902.

*To all whom it may concern:*

Be it known that I, DEMPSTER M. SMITH, a citizen of the United States, residing at Washington, in the District of Columbia, have invented certain new and useful Improvements in Motor-Vehicle Transmission-Gearing, of which the following is a specification.

My invention relates to power transmitting mechanism especially adapted for automobiles and the like. This transmission mechanism is of a class in which the rear axle carries a plurality of face or crown gears, and a transmission shaft arranged at right angles to the axles carries a sliding pinion to engage these gears selectively.

In previous structures, when the axle has carried two crown gears to be engaged by the same pinion and when the pinion is slidably mounted on a fixed axis, a neutral space, at least equal to the face width of the pinion, has been provided between the gears. Within the limit of sizes permitted in a motor vehicle, this arrangement usually limits the number of gear ratios to two, since when a neutral space between the gears is provided the radial distance around the axle is such that it would ordinarily be impossible to provide more than two crown gears. According to this arrangement there is always considerable difference between the two ratios, due to the amount of neutral space necessarily provided. If the two gears provided between them a space less than the width of the pinion, then in shifting the pinion from one gear to the other it would at sometime engage both of the gears at once and there would then be a breakage due to the different tangential speeds of the gears. Other structures have provided for moving the crown gears axially, or for moving the pinion axis and by providing more than one pinion in connection with the movable axis, but all such arrangements introduce complications either in the mechanism itself or its operating means.

My invention provides means by which at least three ratios may be provided within the limits of motor vehicle construction in connection with a multiple crown gear fixed in respect to axial movement and with a single pinion sliding on a fixed axis.

The invention also provides means by which the neutral space ordinarily provided between crown gears may be utilized to provide an additional drive ratio.

The invention also provides means for placing two gears of a crown-gear-drive closer together than the width of the pinion. The particular means employed consists in mounting one of the crown gears loosely in relation to its carrier in respect to rotative movement and providing means for locking and unlocking this gear in relation to its carrier. The gear is unlocked when the pinion is shifted so as to engage the free gear and one other gear at the same time and when the pinion is in full engagement with the free gear that is locked to its carrier for driving. When the pinion engages another gear the free gear may be locked or unlocked, as may be most convenient.

The characteristics and advantages of the invention will be further explained, so far as is necessary, in connection with a detailed description of the accompanying drawing, which shows one exemplifying embodiment of the invention.

Figure 1 is a view, mainly in horizontal section, of sufficient parts of a motor vehicle driving axle structure to show an embodiment of the invention. Fig. 2 is a side elevation from the left, just within the casing of Fig. 1. Fig. 3 is a diagrammatic view of connections between the transmission gearing and other parts of the motor vehicle. Fig. 4 is a sectional detail of a free gear. Fig. 5 is a view of a modification in which only two crown gears are employed.

In Fig. 1, reference character 1 designates an axle casing or housing, and 2 designates a differential casing or housing revolubly mounted therein. A suitable differential gearing is carried within housing 2 for differential driving axle shafts 3 and 4. Housing 2 carries crown gears 5, 6 and 7. At right angles to the rotative axis of the axle structure is a drive shaft or pinion shaft 8, mounted in bearings 9 and 10. Slidably mounted on the pinion shaft is pinion 11 engaging suitable splines or angularities 12 upon the shaft.

In ordinary practice, in combination with sliding pinion 11, two separated crown gears 5 and 7 would be employed, leaving between them a space where the gear 6 is located in the drawing. In shifting from gear 5 to gear 7, therefore, the pinion would occupy a neutral space between the gears and would not be in engagement with both of them at once at any time. This would provide two gear ratios, and if it were attempted to provide three by ordinary means, another neutral space would have to be provided, and, evidently, the diameter of the axle structure would in this way be greatly increased. Evidently also, there is considerable difference between the ratios of gears 5 and 7, and this difference might or might not be greater than is desired in a particular case. If it were attempted, according to ordinary practice, to place a gear in the position of gear 6, rigidly mounted in respect to the axle, damage or breakage would result in shifting the pinion from gear 5 or gear 7 into engagement with gear 6, because when the pinion engaged any two of these gears at the same time, the different tangential speeds of the gears would cause damage or breakage to the teeth of the pinion or the gears. I overcome this difficulty by mounting gear 6 loosely in relation to the other gears and providing clutch means, exemplified by the sliding member 13, for connecting gear 6 rigidly with the differential housing when pinion 11 is in engagement with said gear and free from the other gears. When the pinion is being shifted so that it engages at the same time gear 6 and gear 7, or gear 6 and gear 5, the clutch means is operated so that gear 6 is free in respect to the other gears and the pinion will then take the rotative speed of the fixed gear and will drive gear 6 faster or slower, as the case may be, without unfavorable results.

Referring more particularly to the representative embodiment here shown, the gear carrier 14 may be connected to housing 2 and gears 5 and 7 may be rigidly secured to this carrier. Loose gear 6 may be formed upon ring 15 (see Fig. 4). Flanges 16 on this ring engage under flanges 17 on gears 5 and 7. On the back of ring 15 is an annulus of clutch jaws or teeth 17. At each side of these teeth is placed a bearing or wearing ring 18, filling the space between the gear ring at the sides of the clutch teeth 17 and carrier 14, and providing a readily renewable bearing surface for the gear 6. This is only a detail which will permit the easy formation of clutch teeth 17 upon the loose gear. Sliding member 13, to connect and disconnect the loose gear with its carrier, may be mounted on the differential housing, as shown. This sliding member is provided with one or more arms 19 passing through slots or channels 20, suitably formed in the carrier and in the body of gear 7. These arms carry clutch teeth 21 to coöperate with teeth 17 of the loose ring. In many cases fairly close construction about the axle is necessary, and to permit the necessary movement of member 13 and its arm 19 the differential housing may need to be slotted, as at 22, to accommodate these arms. In differential mechanism ordinarily used, there is, of course, considerable distance between the outer wall of the housing and the differential gears within, and the casing may, of course, be cut away at any point and arms 19 may extend within the limits of the casing 2 to any extent, so long as they do not actually touch the gears. It is, in fact, customary to make apertures through the differential housing in many cases, and provision of openings to accommodate arms 19 will, therefore, not interfere with the design. In cases where it is considered possible to increase the limits of the structure in certain directions, the differential housing may be moved farther away from the axis of pinion 11, and in this case such close design in certain respects will be unnecessary.

Sliding member 13 in Fig. 1 is shown in such position that teeth 21 carried by arms 19 engage teeth 17 of gear 6 and connect the gear rotatively with the differential housing. Pinion 11 is in engagement with the gear and drives it at the intermediate direct ratio. If it is desired to shift the pinion to engage gear 5 or gear 7, sliding member 13 is moved toward the differential housing until clutch teeth 21 are free from teeth 17. Gear 6 is thereupon rotatively free in relation to the other gears; pinion 11 is moved until it commences to engage the teeth of gear 5 or 7; the pinion will then rotate in accordance with the speed of rotation of the fixed gear and gear 6 will be driven idly at a speed corresponding to this rotative speed of the pinion. Further movement of the pinion releases it from gear 6 and brings pinion in full engagement with gear 5 or gear 7, and drive may then be accomplished through either of these gears, and it is of no consequence whether gear 6 is again connected rotatively with its carrier or not.

It will be apparent that this invention is of value in any case where it is desired to place two crown gears closer together than the face width of the pinion. For instance, suppose only two ratios were provided by means of a fixed gear 5 and a loose gear 6 arranged as shown in Fig. 1. Gear 6 would then be released in changing from one to the other and would be connected with the carrier when the pinion 11 drives it, as above described. Evidently, when two crown gears are employed, it is immaterial which one is released when the pinion is shifted, and when the three are employed in shifting from any one to an adjacent one, either of the two gears involved may be released to permit the shift. With three gears, however, the simplest arrangement will be by releasing the middle gear, as shown and described.

The described invention permits the pinion shaft to be mounted with a fixed axis in suitable bearings and permits the differential housing and the crown gears to revolve in a fixed plane, and, yet, by very simple means, provides at least three different direct drive ratios and utilizes the space ordinarily lost between the highest and lowest ratio gears. Provision is made for employing bearing 10 of sufficient size at the rear end of the pinion shaft. Although the particular embodiment shows in many respects standard and approved practice, it is not to be understood that I limit myself to details in any way, except as claimed hereafter.

Various ways of shifting pinion 11 and accomplishing release of gear 6 at the proper time may be employed. Probably the practical success of the invention depends in some applications upon a successful controlling arrangement, and I, therefore, show one suitable form of controlling means, although, evidently, various means may be employed. Shifter 13 might in some cases be controlled by a separate lever and might be normally in inactive position, so that gear 6 would be normally loose. Pinion 11 would then be controlled by its own lever and in ordinary operation would coöperate actively only with gears 5 and 7. When shifted to engage gear 6 for active driving, however, shifter 13 would be manipulated by its lever to lock gear 6 to the carrier, and the driver would have to pay particular attention to releasing this gear before he shifted the pinion. But, in combination with other necessary features of a motor car, simple automatic means may be provided for releasing the loose gear at the proper time, and I here show one such means. Fig. 3 shows, in a diagrammatic way, a motor M, clutch C, clutch-lever L, operating the clutch by means of fork F, and a link 25 connected to the arm 26 on the clutch lever shaft. Shifter 13 may be moved by yoke 27 having a rod or arm 28 actuated by bell-crank arm 29 carried by the bell-crank shaft 30 extending up through the casing and carrying outside the casing an arm 31 bearing a stud 32. The rear end of link 25 has a slot 33 coöperating with stud 32. Bell-crank shaft 30 may be urged by spring 34 engaging arm 35 in such direction that shifter 13 and its clutch teeth are normally in active position to lock gear 6 to its carrier. Pinion 11 is moved by yoke 36 carried by shifting rod 37, and this rod is moved by any suitable lever mechanism not particularly shown. Near the rear end, rod 37 carries a notch 38 coöperating with the end 39 of shifter rod 28.

Supposing pinion 11 and shifter 13 to be in the position shown in Fig. 1, and the clutch C to be engaged as shown in Fig. 3, to shift pinion 11 clutch C should first be released by depressing pedal lever L. At about the time the clutch is released the end of slot 33 encounters stud 32, and, through the bell-crank, shifter-rod 28 is moved against the pull of spring 34 sufficiently to release clutch teeth 21 from gear 6, and at about the same time the end 39 of rod 28 is freed from notch 38 of shifter-rod 37. Gear 6 is then loose in relation to its carrier and the pinion may be shifted by means of rod 37 to engage either gear 5 or gear 7 with perfect safety, as previously explained. All ordinary breakages of connecting parts and all ordinary carelessness on the part of the driver are allowed for in this arrangement. For instance, if the driver should carelessly attempt to shift the pinion without releasing the clutch C, and, therefore, without releasing the positive clutch for gear 6, he would be prevented from doing so by the engagement of detent 39 with rod 37. He would be prevented from moving rod 37 to shift the pinion if any connection between the clutch pedal and shifter 13 were disarranged. In fact, he can only shift the pinion when shifter 13 is moved to free gear 6, and it is then, of course, safe to move the pinion. If no other notches are provided in rod 37, detent 39 on the end of shifter-rod 28 will ride upon the surface of the rod, and gear 6 will remain unlocked until pinion 11 is again brought back into full registry with gear 6. In this case, the actuation of the clutch lever L will not affect the unlocking mechanism 28, etc., except at such times as the pinion is in engagement with gear 6. This would not prevent the careless driver from shifting the pinion from gear 5 or gear 7 into engagement with gear 6 without releasing the main clutch C. No breakage of the pinion or gear teeth would probably result from this carelessness, but damage to teeth 21 and 17 might result, because when the pinion reached full registry with gear 6, teeth 21 would snap into engagement with teeth 17 while the engine was actively driving the pinion. This might cause damage. Such a contingency is possible, however, in any transmission arrangement employing positive teeth either in the gears or in clutches unless an interlock between the friction clutch and the gear is employed. My invention may provide for this contingency by providing additional notches 38$^a$ and 38$^b$, shown in dotted lines in Fig. 1. These notches correspond, respectively, to the pinion 11 when it is in engagement with gear 5 and gear 7, and, evidently, in either case detent 39 will engage with the corresponding notch and hold the pinion in fixed position until the friction clutch is again released. This would involve the engagement of teeth 21 with teeth 17 of the loose gear but such an action will have no active effect and would not be objectionable ordinarily.

In cases where it is not considered desirable to connect the gear releasing mechanism with the main clutch, a single lever may be so constructed and arranged that it will effect the proper disengagement of the free gear and shifting of the pinion 11. So many different controlling arrangements may be employed that it is not considered necessary to show more than one in the present case.

In Fig. 1, the level of rods 37 and 28 and bell-crank arm 29 is supposed to be above the plane of shaft 8 and the axle. But these parts are all shown in one view for greater facility in understanding the operation of the mechanism. Many different arrangements of the controlling mechanism may be employed without affecting the principles involved.

As shown in Fig. 2, arms 19 of shifter 13 are caused to revolve in unison with the differential housing by engagement of these arms with the sides of slots 20 of carrier 14, clearance between the arms and walls of the slots being purposely somewhat exaggerated in Fig. 2. Otherwise, the sleeve of the housing carrying shifter 13 might be splined to provide rotative, sliding connection between the parts.

Fig. 5 shows an embodiment of the invention in which two gear ratios are provided by means of two crown gears and one pinion. In this arrangement the inner crown gear 6ª is provided with inward clutch teeth 50 and with these teeth a sliding jaw clutch 51 splined to the differential sleeve coöperates. The clutch arrangement for connecting and disconnecting the free gears 6ª is in this case somewhat simpler than in Fig. 1. This form of the invention will be advantageous when two direct ratios are required and when by the ordinary arrangement the diameter of the largest crown gear would be too great or when by the ordinary arrangement the difference between the ratios of the two gears would be too great, owing to the necessity of providing between them a space equal to the face width of the pinion.

Evidently, my invention is not limited to two or three crown gears but any plurality of crown gears may be employed, it only being necessary that when the pinion is shifted to engage two of them at once one of these two shall be movable in relation to the other to prevent damage to the teeth in shifting.

A good many different ways of connecting and disconnecting the free gear with its carrier may be provided. I consider it broadly new to provide in connection with an axle and a shifting pinion two crown gears closer together than the face width of the pinion and means to release one of the gears when the pinion is shifted.

I claim:—

1. In a motor vehicle, the combination of an axle, a plurality of crown gears thereon, a pinion adapted to engage two of said gears at one time, and means for releasing one of the gears while two of them are in simultaneous engagement with the pinion.

2. In a motor vehicle, the combination of an axle, two crown gears fixed thereon, a third crown gear between the fixed gears and pinion slidably mounted on an axis at right angles to the gear axis, and adapted to engage both of said gears simultaneously in shifting, and means for connecting and disconnecting the free gear with the axle.

3. In a motor vehicle, the combination of an axle, two crown gears fixed thereon, a third crown gear between the fixed gears and loose in relation to the axle, a pinion adapted to engage said crown gears selectively and to engage two of them at once in shifting, and means for connecting and disconnecting said free gear with the axle.

4. In a motor vehicle, the combination of an axle, a crown gear fast thereon, a crown gear loose thereon, a shiftable pinion, means for locking and unlocking the loose crown gear, and an interlocking connection between said means and said pinion whereby the pinion can only be shifted when said loose gear is free.

5. In a motor vehicle, the combination of an axle, a crown gear fast thereon, a crown gear loose thereon, shiftable clutch means carried by the axle for engaging and disengaging the loose gear, and a shiftable pinion having a fixed axis at right angles to the gear axis, said pinion being arranged to engage said crown gears selectively and to engage two of them simultaneously in shifting.

6. In a motor vehicle, the combination of an axle, a plurality of crown gears thereon, means for connecting and disconnecting one of the gears rotatably with the axle, and a shiftable pinion adapted to engage the crown gears selectively and to engage two of them simultaneously in shifting.

7. In a motor vehicle, the combination of an axle, a plurality of crown gears thereon, means for connecting and disconnecting one of the gears rotatably with the axle, a shiftable pinion adapted to engage the crown gears selectively and to engage two of them simultaneously in shifting, and an interlocking device to insure that the releasable crown gear is in disconnected condition when the pinion is in simultaneous engagement with it and another of the crown gears.

DEMPSTER M. SMITH.

Witnesses:
A. M. PARKINS,
M. A. WOOD.

Copies of this patent may be obtained for five cents each, by addressing the "Commissioner of Patents, Washington, D. C."